(No Model.)
J. D. BROODER.
PACKER FOR OIL OR GAS WELLS.
No. 363,111. Patented May 17, 1887.
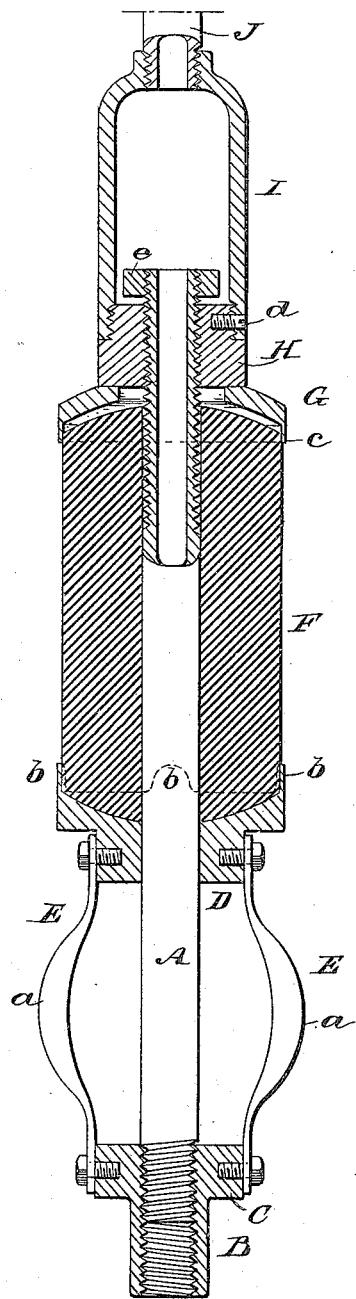
WITNESSES:
INVENTOR:
BY
ATTORNEYS.

UNITED STATES PATENT OFFICE.

JOHN D. BROODER, OF KANE, PENNSYLVANIA.

PACKER FOR OIL AND GAS WELLS.

SPECIFICATION forming part of Letters Patent No. 363,111, dated May 17, 1887.

Application filed October 25, 1886. Serial No. 217,151. (No model.)

*To all whom it may concern:*

Be it known that I, JOHN D. BROODER, of Kane, in the county of McKean and State of Pennsylvania, have invented a new and Improved Packer for Oil and Gas Wells, of which the following is a specification, reference being had to the accompanying drawing, which is a longitudinal section of my improved packer, the tube A, however, being shown in section at its upper end only.

The object of my invention is to provide an efficient packing for the tubes of oil and gas wells, which may be readily applied and easily removed.

My invention consists in a tube-section provided with an elastic rubber cylinder inclosing a part of the section and carrying a device for engaging the wall of the well and preventing the tube from turning; also, in a nut arranged to be turned on the tube-section by the well-tubing for compressing the rubber packing-cylinder and causing it to expand laterally and press against the walls of the well.

The tube A is threaded at opposite ends, and upon the lower end is screwed a sleeve, B, provided with a collar, C. Above the sleeve B a collar, D, is loosely placed upon the tube A, and to the collars C D are secured the outwardly-bowed retainers E, which are provided with sharp edges $a$ for engagement with the walls of the well. Two or more of the retainers E may be secured to the collars C D. The collar D is enlarged in diameter above the retainer E, and is provided with ears $b$ for confining the elastic rubber cylinder F to the top of the collar. The upper surface of the collar D is concaved to afford a bearing for the lower end of the rubber cylinder, and to the top of the rubber cylinder F is fitted a concave cap, G, provided with the rim $c$, which fits down over the upper end of the rubber cylinder.

A nut, H, fitted to the thread on the upper end of the pipe-section A, is arranged to bear upon the top of the cap G and force it down into contact with the rubber cylinder F. The outside of the nut H is threaded to receive the reducer I, and a screw, $d$, is inserted in the nut H, through a hole in the reducer, to prevent the reducer from unscrewing from the nut. On the extreme upper end of the tube A, and within the reducer I, is placed a nut, $e$, which prevents the nut H from unscrewing from the tube A. In the upper end of the reducer I is inserted the upper section, J, of the well-tube.

The packer is carried to its position in the well while in a contracted state, as shown in the drawing, the retainers E engaging the walls of the well and preventing the tube A from turning. The elastic rubber packing-cylinder F is compressed endwise by screwing the nut H down upon the cap G by turning the tube J. As pressure is exerted on the upper end of the cylinder F, its diameter is increased, so as to cause it to fill the bore of the well. The increased pressure also expands the retainers more or less, causing them to bite more deeply into the walls of the well.

When it is desired to remove the packer from the well, the pipe J is turned in the reverse direction, relieving the pressure on the end of the elastic rubber cylinder F by unscrewing the nut H, when the cylinder contracts and the packer may be withdrawn.

Having thus described my invention, I claim as new and desire to secure by Letters Patent—

1. In a packer for oil-wells, the combination, with the well-tube A, of the outwardly-convex retainers E, having the outer longitudinal knife edges, as specified.

2. A packer for oil and gas wells, formed of the tube-section A, carrying retainers E, the elastic cylinder F, and means for compressing the said cylinder endwise, substantially as described.

3. In a packer for oil-wells, the combination, with the tube-section A, of the collars C D, the outwardly-bowed retainers E, the cap G, the elastic cylinder on the tube-section between cap G and collar D, the nut H, and the reducer I, substantially as described.

4. The combination, in a packer for oil-wells, of the threaded tube A, the collar C, screwed on the lower end of the threaded tube, the concaved collar D, the outwardly-bowed retainers E, secured to the collars C D, the elastic centrally-apertured cylinder F, received on the tube A, the concaved cap G, the nut H, received on the upper threaded end of the tube A, the reducer I, attached to the nut H, and the tube J, inserted in the upper end of the reducer I, substantially as described.

JOHN D. BROODER.

Witnesses:
A. Y. JONES,
R. W. SMITH.